United States Patent [19]
Funk

[11] 3,798,594
[45] Mar. 19, 1974

[54] VEHICLE ATTITUDE WARNING DEVICE

[75] Inventor: Francis Claire Funk, Dubuque, Iowa

[73] Assignee: Deere & Company, Moline, Ill.

[22] Filed: Nov. 28, 1972

[21] Appl. No.: 310,114

[52] U.S. Cl. ............................ 340/52 H, 200/61.45
[51] Int. Cl. ............................................. G08b 21/00
[58] Field of Search .............. 340/52 H, 53, 61, 65; 200/61.45, 61.52

[56] References Cited
UNITED STATES PATENTS
3,715,533   2/1973   Seaton ............................ 200/61.52
1,411,298   4/1922   Osborn ........................ 200/61.45 R Primary Examiner—Alvin H. Waring

[57] ABSTRACT

A system is provided for warning an operator of the fact that his vehicle is approaching an undesirable degree of tilt. The system includes a pendulum or gravity-responsive member which is mounted for universal movement in a housing which also supports a conducting ring in surrounding relationship to a stem or pin portion of the pendulum. The pendulum stem is also made of conducting material and cooperates with the conductor ring to define a switch which is normally open but which is closed to energize a warning device at the operator's station when the vehicle becomes tilted to a predetermined undesired position.

3 Claims, 2 Drawing Figures

PATENTED MAR 19 1974          3,798,594

VEHICLE ATTITUDE WARNING DEVICE

BACKGROUND OF THE INVENTION

The present invention relates to a warning system for apprising a vehicle operator that his vehicle is dangerously close to the angle of tilt at which the vehicle will roll over.

Several known roll-over warning systems are of a construction including a housing adapted to be fixed on a vehicle and pivotally supporting a gravity-responsive member or pendulum such that the latter member remains generally vertically disposed regardless of the tilting movements of the vehicle, the relative movement between the support housing and the pivotally mounted member being used for activating an electrical safety cut-out switch for turning off the vehicle engine when the vehicle reaches a predetermined tilt.

These known warning devices are not entirely satisfactory since the safety cut-out switches are often of a complicated nature and the devices are not easily adaptable for use with vehicles having different tilting characteristics.

SUMMARY OF THE INVENTION

According to the present invention, there is provided a novel warning device for indicating to a vehicle operator that his vehicle is in a precarious position of tilt.

It is a broad object of the invention to provide a warning device which is of simple construction and which can be easily adapted for use with vehicles having differing tilt characteristics.

More specifically, it is an object of the invention to provide an electrical circuit for actuating an electrical warning device, the circuit including a source of electrical current which is connectible to the warning device through means of a normally open switch comprising a first contact mounted for movement with a housing, adapted to be fixed to a vehicle, and a second contact in the form of a gravity-responsive member or pendulum pivotally mounted on the housing and engageable by the first contact to complete the circuit when the housing has tilted a predetermined amount relative to the gravity-responsive member.

Still another object is to provide a gravity-responsive member as described above which is in the form of an elongate pin having a weight fixed to the bottom thereof and being universally connected to the housing at a location above the weight and the first contact being in the form of a ring located so as to surround the upper end of the pin. Further, it is an object to releasably mount the ring member in order that ring members of different shapes may be substituted in order to adapt the warning system for use with vehicles having different tilting characteristics.

Another object is to provide a housing which defines a fluid reservoir in its lower portion with the aforementioned weight on the gravity-responsive member being positioned to move through the fluid chamber, the chamber being adapted to hold a viscous dampening fluid. Further, it is an object to construct the housing of vertical sections, one of the sections being releasably connectible to the top of the fluid reservoir and having the first and second contacts mounted thereon.

These and other objects will become apparent from the appended drawings and the ensuing description.

DESCRIPTION OF THE PREFERRED EMBODIMENT

Figure 2:
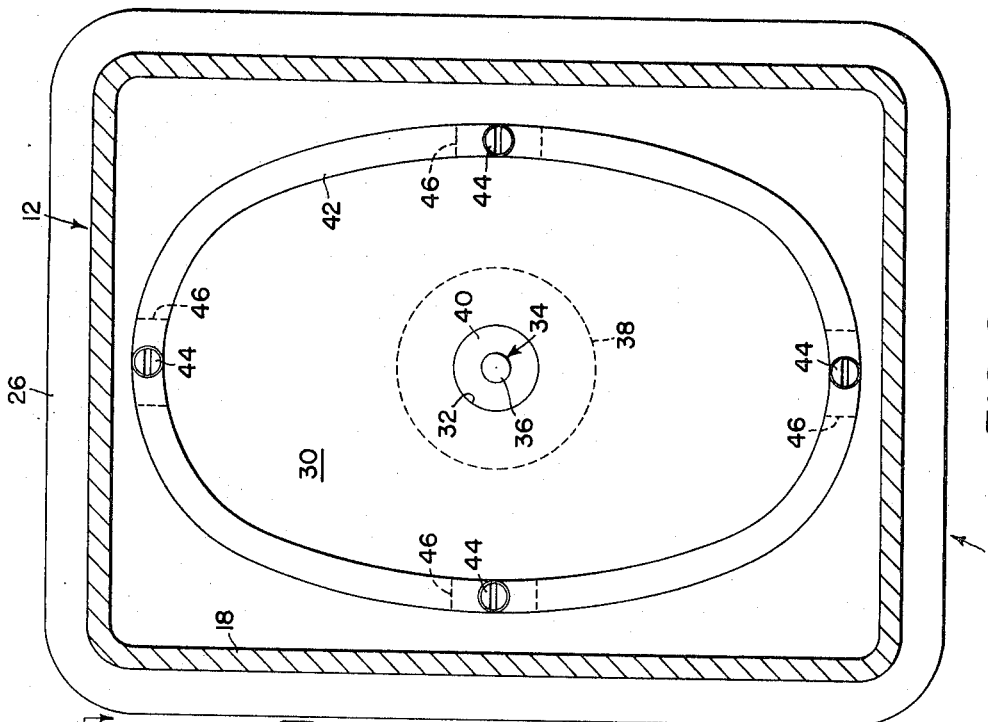
FIG. 2 is a sectional view taken along the line 2—2 in FIG. 1 but with the electrical circuit being omitted.

Referring now to the drawing, therein is shown a roll-over warning system indicated in its entirety by the reference numeral 10. The warning system 10 comprises a box-like housing 12 including lower, intermediate and upper sections 14, 16 and 18, respectively. The lower and intermediate sections 14 and 16 respectively have abutting flanges 20 and 22 at the top and bottom thereof and a plurality of screws (not shown) extend through the flanges to releasably interconnect the lower and intermediate sections. Similarly, the top and bottom respectively of the intermediate and upper sections 16 and 18 are provided with abutting flanges 24 and 26 through which further screws (not shown) extend to releasably interconnect the intermediate and upper sections. It is here noted that the lower section 14 defines a fluid chamber or reservoir in which a dampening fluid 28 is located, the purpose of the fluid to be described hereinafter.

The intermediate housing section 16 includes a horizontal bottom wall 30 having a vertically extending centrally located opening therein, that portion of the wall defining the opening being of an annular spherical segment shape defining an upwardly facing seating or bearing surface 32. As viewed in FIG. 1, a gravity-responsive member or pendulum 34 projects vertically through the opening in the bottom wall 30. The member 34 comprises a cylindrical rod-like stem or pin 36 having a spherical weight 38 removably secured to the lower end thereof and having an intermediate spherical bearing portion 40 seated on the bearing surface 32. Thus, it will be appreciated that the gravity-responsive member 34 is supported by the box-like housing 12 for universal pivotal movement relative thereto. Surrounding the upper portion of the stem 36 is an electrical contact or conducting ring 42 which is releasably secured, as by a plurality of screws 44, to the tops of a plurality of equispaced projections 46 extending upwardly from the bottom wall 30 of the intermediate housing section 16. Thus, it can readily be seen that when the housing 12 is tilted in any direction, the gravity-responsive member 34 will remain in a vertical upright position and the conductor ring 42 will contact the stem 36 after a predetermined amount of tilt. The stem 36 and the conductor ring 42 cooperate to form an electrical switch, the switch being located in a warning device actuating circuit as is to be further explained below.

The warning device actuating circuit comprises a source of electrical current here shown as a battery 48 having its positive terminal connected to the conductor ring 42 by a lead 50. A lead 52 is connected to the negative terminal of the battery and extends from there first to a warning device, here shown as a light 54, and then to the stem or pin 36 at a location in the vicinity of the spherical bearing portion 40. The location of the connection of the lead 52 with the stem 36 has significance since by being adjacent to the bearing portion 40, the connection does not undergo very much movement in those instances when the conductor ring 42 contacts the stem 36. It can readily be seen then that the only time that the circuit will be completed so as to energize the light 54 is when the stem 36 is in contact with the conductor ring 42, the stem 36 of course being made of a material which will conduct electricity.

Figure 1:
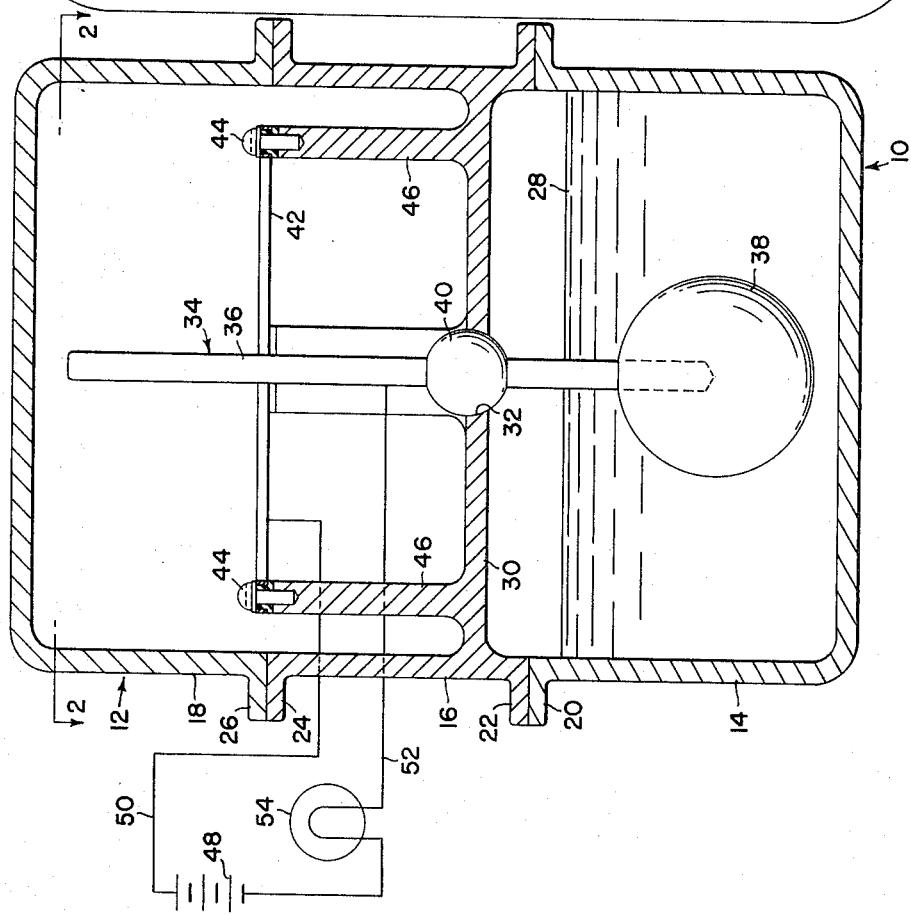
FIG. 1 is a composite view showing a the housing, pendulum and contact ring of the warning system in vertical section and showing the electrical circuit schematically.

In operation, the box-like housing 12 is installed on a vehicle so as to be in a normal upright position, as shown in FIG. 1, when the vehicle is on a level horizontal surface. If the stability characteristics of the vehicle so dictates, the conductor ring 42 will be replaced by a conductor ring shaped to correspond to the stability characteristics of the vehicle. This substitution may easily be accomplished by removing the top section 18 of the housing and then by removing the screws 44 securing the ring 42 to the projections 46. A reverse procedure is then followed in mounting the replacement ring.

The warning system is then in a condition for operation. Assuming, that when the vehicle is viewed in its direction of travel, the warning system 10 appears as shown in FIG. 1, and that the vehicle becomes tilted such that its right side is elevated above its left side, the right side of the housing will similarly be elevated above its left side. The universal pivotal connection of the gravity-responsive member 34 with the housing 12 will permit the member 34 to remain substantially undisturbed in its vertical position during the tilting of the housing. Once the right side of the vehicle and hence the right side of the housing have reached a predetermined tilt position with their right sides above their left side whereat the vehicle is dangerously close to the roll-over condition, the conductor ring 42 will contact the stem 36 of the gravity-responsive member and complete the electrical circuit to energize the warning light 54 which will, of course, light up and indicate to the operator that he should take appropriate steps to maneuver his vehicle into a safer position.

At times, a vehicle may be operated such that it may undergo rapid changes between dangerous tilting conditions, and in order that the warning system 10 will not be adversely affected by these changes, the spherical weight 38 of the gravity-responsive member will act in conjunction with the influence of the viscous dampening fluid 28 to keep the gravity-responsive member 34 from undergoing oscillations of any appreciable degree.

While the description and operation hereinabove has been directed to a warning system having a vertically disposed gravity-responsive member, it is to be noted that a horizontal gravity-responsive member may be similarly employed, the member then being mounted as a balance beam which is balanced so as to remain in a horizontal disposition when the vehicle is horizontal.

I claim:

1. A roll-over warning system for use on a vehicle such as a tractor, or the like, comprising: a completely enclosed boxlike housing constructed of electrically non-conductive material and including lower, intermediate and upper sections releasably interconnected to each other; said lower section defining a fluid chamber; said intermediate section including a bottom wall overlying said fluid chamber and having an aperture therein defining a spherically curved bearing surface; a pendulum including a substantially rod-like stem of electrically conductive material having a weight carried at the lower end thereof; said stem including an intermediate spherical bearing portion seated in the spherically curved bearing surface defined by said aperture and the stem being disposed such that the weight is located in said fluid chamber; a ring of electrically conductive material being releasably fixed to said intermediate section in surrounding relationship to said stem at a location spaced above said intermediate spherical bearing portion; a source of electric current; a circuit connected to said source; an electrical warning device connected in said circuit; said stem and ring forming respective contacts of a switch and being connected in said circuit between said source and said warning device, whereby when said housing is moved to a predetermined attitude, said stem will contact said ring thus completing the circuit and effecting energization of said warning device.

2. The warning device defined in claim 1 wherein said intermediate section of the housing includes a plurality of projections extending upwardly from the bottom wall thereof and said ring being releasably secured to the respective tops of said projections.

3. The warning device defined in claim 1 wherein the stem is connected in the circuit by means of a lead having one end secured to the stem at a location adjacent said spherical bearing portion, whereby the lead will undergo very little movement in the event that the pendulum swings relative to the housing.

* * * * *